US008176202B2

(12) United States Patent
Takeuchi et al.

(10) Patent No.: US 8,176,202 B2
(45) Date of Patent: May 8, 2012

(54) MULTI-HOST MANAGEMENT SERVER IN STORAGE SYSTEM, PROGRAM FOR THE SAME AND PATH INFORMATION MANAGEMENT METHOD

(75) Inventors: Shinya Takeuchi, Fujisawa (JP); Haruki Masuda, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 394 days.

(21) Appl. No.: 11/969,327

(22) Filed: Jan. 4, 2008

(65) Prior Publication Data

US 2009/0006602 A1    Jan. 1, 2009

(30) Foreign Application Priority Data

Jun. 27, 2007   (JP) ................................ 2007-169751

(51) Int. Cl.
    *G06F 15/173*  (2006.01)
    *G01R 31/08*  (2006.01)

(52) U.S. Cl. ......................... 709/238; 709/223; 370/248

(58) Field of Classification Search .................. 709/223, 709/238; 370/248
See application file for complete search history.

(56) References Cited

U.S. PATENT DOCUMENTS

| 6,760,783 | B1 * | 7/2004 | Berry ............................ 719/318 |
| 2002/0075873 | A1 * | 6/2002 | Lindhorst-Ko et al. ........ 370/394 |
| 2003/0028514 | A1 * | 2/2003 | Lord et al. ........................ 707/1 |
| 2005/0033828 | A1 * | 2/2005 | Watanabe ..................... 709/219 |
| 2005/0114741 | A1 * | 5/2005 | Chen et al. ..................... 714/47 |
| 2007/0055797 | A1 | 3/2007 | Shimozono |

FOREIGN PATENT DOCUMENTS

JP    2007-72571    3/2007

* cited by examiner

*Primary Examiner* — Ranodhi Serrao
(74) *Attorney, Agent, or Firm* — Antonelli, Terry, Stout & Kraus, LLP.

(57) ABSTRACT

Provided is a multi-host management server that includes: a reception section that receives failure information about paths from hosts and stores the received failure information in a failure information reception queue; an extraction section that extracts from the failure information reception queue plural pieces of failure information about a plurality of paths received from a common host; a retrieval section that retrieves failure information about one path from the extracted plural pieces of failure information about the plurality of paths; a registration section that registers information indicating a host in a host refresh queue for updating path information; a deletion section that deletes, after the registration, the plural pieces of failure information about the plurality of paths received from the common host from the failure information reception queue; and an execution section that executes update of path information for the relevant host.

12 Claims, 14 Drawing Sheets

| HOST | IP ADDRESS | VERSION | FLAG |
|------|-----------|---------|------|
| Host-1 | 172.1.1.1 | 1.0 | 0 |
| Host-2 | 172.1.1.5 | 2.0 | 1 |
| Host-3 | 172.2.1.1 | 1.0 | 0 |

24A / 24B / 24C / 24D

24

| PATH | HOST | HBAP | IVOL | STRG | CHAP | EVOL | STAT |
|------|------|------|------|------|------|------|------|
| 0001 | HOST-5 | 1 | 1 | ST-1 | 1 | 1 | online |
| 0002 | HOST-5 | 2 | 1 | ST-1 | 2 | 1 | online |
| 0003 | HOST-5 | 3 | 1 | ST-1 | 3 | 1 | online |
| 0004 | HOST-5 | 4 | 1 | ST-1 | 4 | 1 | online |
| 0005 | HOST-4 | 1 | 1 | ST-1 | 1 | 2 | online |
| 0006 | HOST-4 | 2 | 1 | ST-1 | 2 | 2 | offline |
| 0007 | HOST-4 | 3 | 1 | ST-1 | 3 | 2 | online |
| 0008 | HOST-4 | 4 | 1 | ST-1 | 4 | 2 | online |

25A / 25B / 25C / 25D / 25E / 25F / 25G / 25H

25

| 26A | 26B | 26C |
|---|---|---|
| HOST | PATH | DATE |
| Host-2 | 0006 | 2007.5.10 13:40:15 |
| Host-1 | 0002 | 2007.5.10 15:12:43 |
| Host-5 | 0003 | 2007.5.11 20:10:55 |
| Host-1 | 0005 | 2007.5.11 22:44:03 |

| PATH | HBAP | IVOL | STRG | CHAP | EVOL | STAT |
|------|------|------|------|------|------|------|
| 0001 | 1 | 1 | ST-1 | 1 | 1 | online |
| 0002 | 2 | 1 | ST-1 | 2 | 1 | online |
| 0003 | 3 | 1 | ST-1 | 3 | 1 | online |
| 0004 | 4 | 1 | ST-1 | 4 | 1 | online |

Columns: 35A, 35B, 35C, 35D, 35E, 35F, 35G

35

MULTI-HOST MANAGEMENT SERVER IN STORAGE SYSTEM, PROGRAM FOR THE SAME AND PATH INFORMATION MANAGEMENT METHOD

CROSS-REFERENCES TO RELATED APPLICATIONS

This application relates to and claims priority from Japanese Patent Application No. JP2007-169751, filed on Jun. 27, 2007, the entire disclosure of which is incorporated herein by reference.

BACKGROUND

1. Field of the Invention

The invention relates generally to a storage system. More specifically, the present invention relates to a multi-host management server for efficiently updating path information in a storage system in which a plurality of paths is set between a plurality of hosts and a storage apparatus(es).

2. Description of Related Art

In companies or similar environments, a storage system is constructed by connecting a plurality of storage apparatuses to a host(s) using paths via a SAN (Storage Area Network) in order to store and manage a large amount of data. Typically, not a single path but multiple paths are set between the host(s) and the storage apparatuses, which is generally referred to as "multi-path."

Each host operates software for managing the multi-path to realize functions such as path configuration detection, path failure detection and path switching (hereinafter referred to as multi-path management software).

For a storage system having a management computer connected to hosts and storage apparatuses via a SAN, a technique for managing the multi-path has been disclosed, where when receiving a report about a path failure from a host system or a storage apparatus, the management computer commands the relevant host or storage apparatus to set a new path definition (see JP2007-72571 A).

In a large-scale system environment, a multi-host management server is provided for collectively managing and monitoring multiple paths set to each host in order to check if each host is operating normally. The multi-host management server stores path information for each host. In order to keep the path information stored in the multi-host management server up to date, a user manually operates the multi-host management server to issue a query to each host and update the relevant path information. The processing—the multi-host management server updating path information stored in the multi-host management server based on path information obtained from each host—is generally called "host refresh."

In the above arrangement, each host monitors the statuses of paths set to the host itself. When a host detects path failure, this host reports failure information about the failure to the multi-host management server. However, a user cannot obtain up-to-date path information unless the user manually executes a host refresh. More specifically, although the user can recognize the path failure by receiving the failure information, the user cannot recognize which path the failure has occurred on without acquiring the up-to-date path information.

As described above, in the related art, the user has to manually execute a host refresh after the multi-host management server receives failure information from the relevant host, which is troublesome for the user. Accordingly, the multi-host management server is preferably set up so that it can automatically perform the host refresh.

However, if the multi-host management server executes a host refresh every time it receives failure information and as many times as the number of pieces of received failure information, unnecessary transfers of path information will occur. In particular, there is a kind of failure in which the path status is instantaneously switched between normal status and failure status (hereinafter referred to as instantaneous path interruption), and this type of failure can occur several number of times in a short time period, so executing a host refresh every time a failure occurs will result in a large load on the network.

If the failure information contains many pieces of path information, the multi-host management server can update the path information stored in the multi-host management server only by referring to the failure information. However, the increase in an amount of failure information data will increase the load on the network, so the amount of failure information data is not something that can be indiscriminately increased.

In light of these circumstances, there has been demand for a storage system capable of performing the host refresh automatically and without resulting in a large load on a network.

SUMMARY

In the light of the above problems, it is an object of the present invention to provide a multi-host management server capable of efficiently and automatically performing host refresh for updating path information by keeping failure information received from an arbitrary host for a predetermined time period and retrieving one piece of failure information from those received from the same host during the predetermined time period.

In order to solve the problem above, provided according to an aspect of this invention is a multi-host management server that manages a plurality of hosts with a plurality of paths set between the hosts and a storage apparatus and stores path information for each host, the multi-host management server including: a reception section that receives failure information about the paths from the hosts and stores the received failure information in a failure information reception queue; an extraction section that extracts plural pieces of failure information about a plurality of paths received from a common host from the failure information reception queue; a retrieval section that retrieves failure information about one path from the extracted plural pieces of failure information about the plurality of paths; a registration section that registers, based on the retrieved failure information about the one path, information indicating a host relevant to this failure information in a host refresh queue for updating path information; a deletion section that deletes, after the registration of the host-indicating information in the host refresh queue, the plural pieces of failure information about the plurality of paths received from the common host from the failure information reception queue; and an execution section that executes, based on the host-indicating information, update of path information for the relevant host.

With the above arrangement, the host refresh does not have to be executed every time or soon after the multi-host management server receives the failure information. If, after receiving the failure information report from a certain host, new failure information is received from the same host, the multi-host management server retrieves failure information for one path and executes a host refresh. Accordingly, the number of times host refresh is executed can be reduced. In addition, if failures occur several times in a short time period, like in the case of instantaneous path interruption, the number of times host refresh is executed can be greatly reduced.

Provided according to another aspect of this invention is a multi-host management server that manages a plurality of hosts with a plurality of paths set between the hosts and a storage apparatus and stores path information for each host, the multi-host management server including: a reception section that receives failure information about the paths from the hosts and stores the received failure information in a failure information reception queue; a screen display section that refers to a host information table storing information indicating whether or not path information is up-to-date for each host and displays, after failure information about a path is received from a certain host, information indicating whether or not path information for the relevant host is up-to-date, on a screen of the multi-host management server; an extraction section that extracts from the failure information reception queue plural pieces of failure information about a plurality of paths received from a common host after a predetermined time period from reception times of the plural pieces of failure information in the failure information reception queue; a retrieval section that retrieves failure information about one path from the extracted plural pieces of failure information about the plurality of paths; a registration section that registers, based on the retrieved failure information about the one path, information indicating a host relevant to this failure information in a host refresh queue for updating path information; a deletion section that deletes, after the registration of the host-indicating information in the host refresh queue, the plural pieces of failure information about the plurality of paths received from the common host from the failure information reception queue; and an execution section that executes, based on the host-indicating information, update of path information for the relevant host.

With the above arrangement, the host refresh does not have to be executed every time or soon after the multi-host management server receives the failure information. If, after receiving the failure information report from a certain host, new failure information is received from the same host, the multi-host management server retrieves failure information for one path and executes a host refresh. Accordingly, the number of times host refresh is executed can be reduced. In addition, if failures occur several times in a short time period, like in the case of instantaneous path interruption, the number of times host refresh is executed can be greatly reduced. Furthermore, a user can recognize whether or not information for the paths set to an arbitrary host is up-to-date.

Provided according to another aspect of this invention is a multi-host management program executed by a multi-host management server that manages a plurality of hosts with a plurality of paths set between the hosts and a storage apparatus and stores path information for each host, the program operating the multi-host management server to perform the following processing: receiving failure information about paths from the hosts and stores the received failure information in a failure information reception queue; extracting from the failure information reception queue plural pieces of failure information about a plurality of paths received from a common host; retrieving failure information about one path from the extracted plural pieces of failure information about the plurality of paths; registering, based on the retrieved failure information about the one path, information indicating a host relevant to this failure information in a host refresh queue for updating path information; deleting, after the registration of the host-indicating information in the host refresh queue, the plural pieces of failure information about the plurality of paths received from the common host from the failure information reception queue; and updating, based on the host-indicating information, path information for the relevant host.

With the above arrangement, the host refresh does not have to be executed every time or soon after the multi-host management server receives the failure information. If, after receiving the failure information report from a certain host, new failure information is received from the same host, the multi-host management server retrieves failure information for one path and executes a host refresh. Accordingly, the number of times host refresh is executed can be reduced. In addition, if failures occur several times in a short time period, like in the case of instantaneous path interruption, the number of times host refresh is executed can be greatly reduced Provided according to another aspect of this invention is a path information management method performed by a multi-host management server that manages a plurality of hosts with a plurality of paths set between the hosts and a storage apparatus and stores path information for each host, the method including the steps of: a reception step of receiving failure information about paths from the hosts and stores the received failure information in a failure information reception queue; a screen display step of referring to a host information table storing information indicating whether or not path information is up-to-date for each host and displaying, after failure information about a path is received from a certain host, information indicating whether or not path information for the relevant host is up-to-date on a screen of the multi-host management server; an extraction step of extracting from the failure information reception queue plural pieces of failure information about a plurality of paths received from a common host, after a predetermined time period from reception times of the plural pieces of failure information in the failure information reception queue; a retrieval step of retrieving failure information about one path from the extracted plural pieces of failure information about the plurality of paths; a registration step of registering, based on the retrieved failure information about the one path, information indicating a host relevant to this failure information in a host refresh queue for updating path information; a deletion step of deleting, after the registration of the host-indicating information in the host refresh queue, the plural pieces of failure information about the plurality of paths received from the common host from the failure information reception queue; and an execution step of executing, based on the host-indicating information, update of path information for the relevant host.

With the above arrangement, the host refresh does not have to be executed every time or soon after the multi-host management server receives the failure information. If, after receiving the failure information report from a certain host, new failure information is received from the same host, the multi-host management server retrieves failure information for one path and executes a host refresh. Accordingly, the number of times host refresh is executed can be reduced. In addition, if failures occur several times in a short time period, like in the case of instantaneous path interruption, the number of times host refresh is executed can be greatly reduced.

EFFECT OF INVENTION

The multi-host management server of this invention is arranged to temporarily store failure information in a queue and execute a host refresh after a predetermined time period. With the arrangement, since the multi-host management server retrieves only the latest failure information from plural pieces of failure information for a common host and deletes the remaining old failure information, the number of times host refresh is indiscriminately executed can be reduced. In particular, when a plurality of failures occurs in a short time period, like in the case of instantaneous path interruption, the load on a network can be greatly reduced.

In addition, the multi-host management server in this invention is arranged so that, when the host refresh has not been executed even after the reception of the failure information, a user can recognize that situation. This arrangement can avoid problems in which a user performs an operation using a path having a failure (e.g., disconnection) without being aware of the failure and causes trouble to occur in the host's processing.

Other aspects and advantages of the invention will be apparent from the following description and the appended claims.

BRIEF DESCRIPTION OF THE DRAWINGS

FIG. 5 is a conceptual diagram showing how the multi-host management server requests path information according to the above embodiment.

FIG. 8 is a diagram showing a path information table managed by a host according to the above embodiment.

DETAILED DESCRIPTION OF PREFERRED EMBODIMENTS (1) Configuration of Storage System FIG. 1 is a conceptual diagram showing the entire system of a storage system according to an embodiment of this invention.

Figure 1:
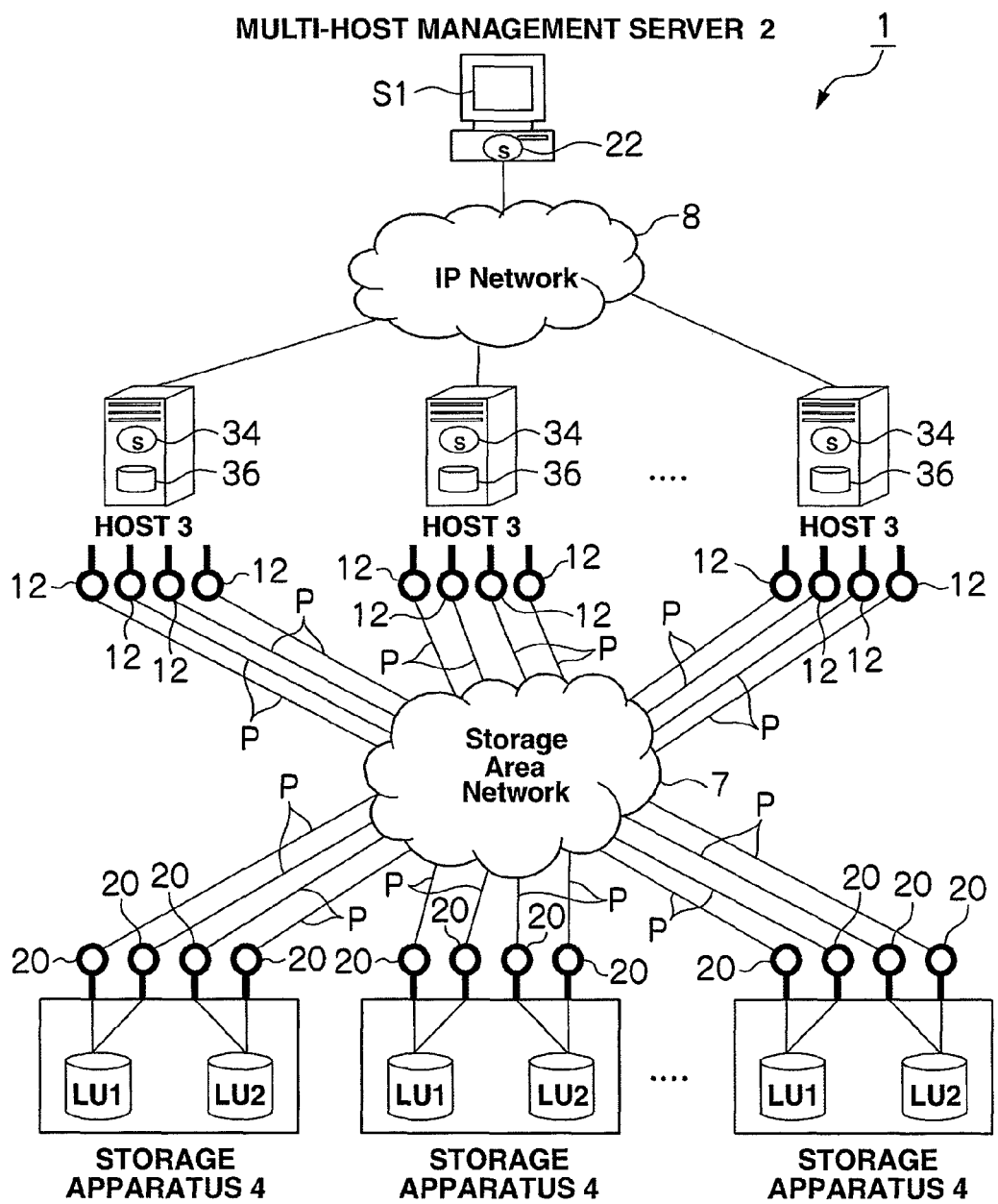
FIG. 1 is an overall conceptual diagram showing a storage system according to an embodiment of this invention.

The reference numeral 1 denotes the storage system of this invention. The storage system 1 of this invention has the configuration in which a multi-host management server 2 is connected to a plurality of hosts 3 via an IP network 8 and the plurality of hosts 3 is connected to a plurality of storage apparatuses 4 using paths P via a SAN 7.

In the SAN 7, HBA (Host Bus Adapter) ports 12 on the host 3 side and CHA (Channel Adapter) ports 20 on the storage apparatus 4 side are connected to each other by fibre cables.

In this specification, the "path P" may be a logical path or a physical path.

Figure 2:
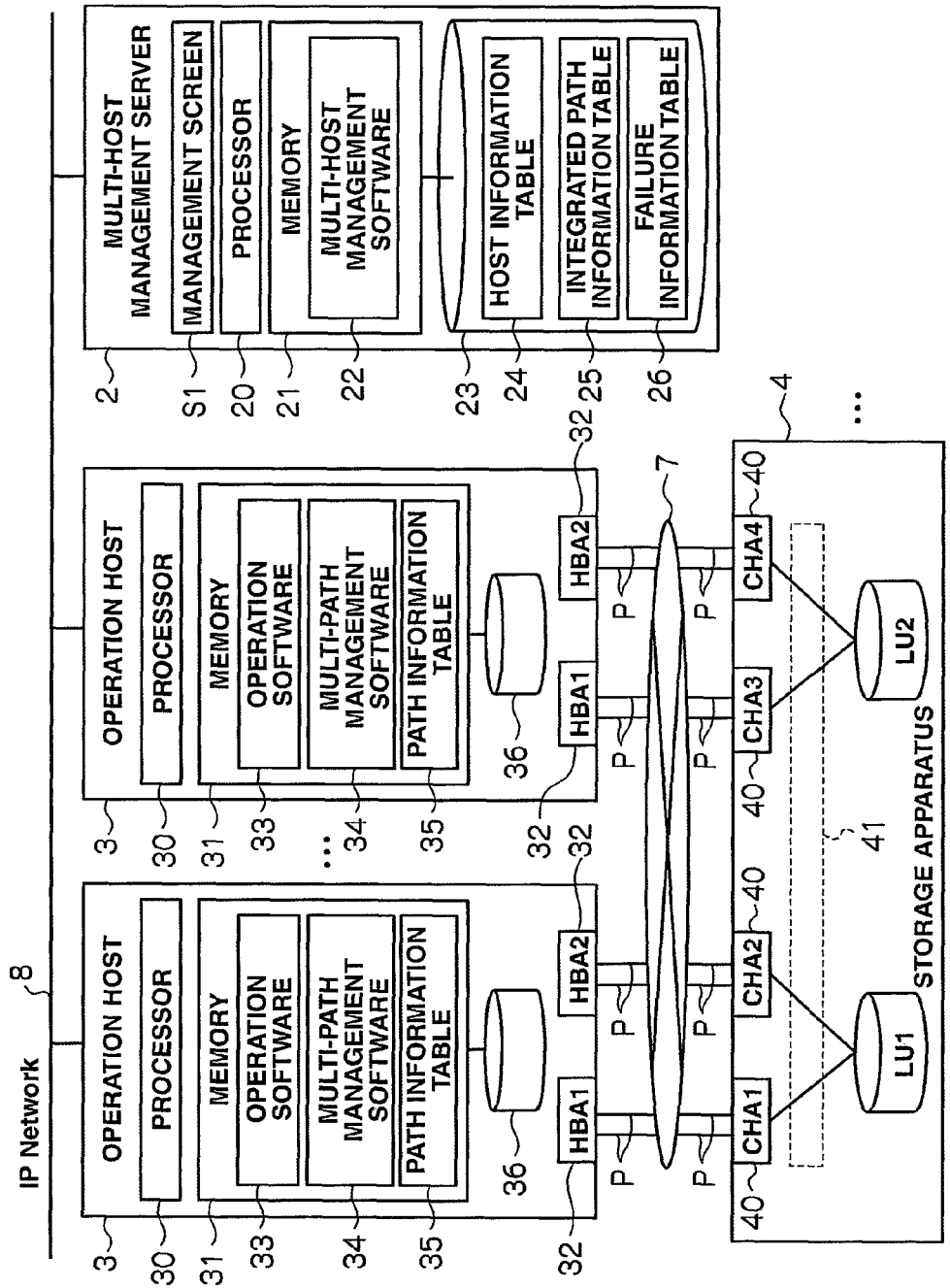
FIG. 2 is an overall block diagram showing the storage system according to the above embodiment.

FIG. 2 is an overall block diagram showing the storage system 1 of this invention.

A multi-host management server 2 is a server for managing the entire system, which includes a processor 20, a memory 21 and memory device 23. In addition, the multi-host management server 2 includes: a management screen S1 that displays a GUI (Graphical User Interface) for setting various settings or issuing an execution command to each host 3; and an input apparatus (not shown) such as a keyboard and a mouse used for various types of operation, input and setting.

A memory 21 stores various control programs that are read out from the memory device 23 when the multi-host management server is started. The multi-host management server 2 executes various types of processing by operating the processor 20 to execute these control programs. Multi-host management software 22 is one of the control programs and stored in the memory 21.

The multi-host management software 22 is software for monitoring paths set to each host 3. When the multi-host management server 2 detects a failure in a certain path P, the multi-host management server 2 receives from the relevant host 3 at least part of some path information, i.e., a host name and a path identifier, as failure information.

The memory device 23, which may be a hard disk or the like, stores various control programs and various control parameters. The memory device 23 also stores a host information table 24, an integrated path information table 25 and a failure information table 26 (each will be described later). As the management screen S1, for example, a CRT (Cathode-Ray Tube) or a liquid crystal monitor may be used.

Each host 3 includes information processing resources such as a processor 30, a memory 31, a plurality of host bus adapters 32 and a memory device 36. The memory 31 stores operation software 33, and this software is operation application software. The host 3 performs predetermined operation processing by operating the processor 30 to execute the operation software. The memory 31 also stores multi-path management software 34 and a path information table 35, which will be described later.

The host bus adapters 32 are interfaces the host 3 uses to access the storage apparatuses 4 via the SAN 7, and an FC (Fibre Channel) card or the like may be employed for each host bus adapter 32.

The storage apparatuses 4 include a plurality of channel adapters 40, a controller 41 and a plurality of memory devices (not shown).

The channel adapters 40 are interfaces the storage apparatuses 4 use to communicate with the hosts 3 via the SAN 7, and an FC card or the like may be employed for each channel adapter 40. The channel adapters 40 are each provided with one or more ports, each port being assigned a network address such as a WWN (World Wide Name) and an IP (Internet Protocol) address for identifying the port on the SAN 7.

The memory devices (not shown) installed in the storage apparatuses 4 may be expensive disk drives such as FC disks, or inexpensive disk drives such as SATA (Serial AT Attachment) disks and optical disc drives. One or more logical volumes LU are defined in storage areas provided by one or more memory devices. The logical volume LU is an external volume for externally storing data in the host 3 and consists of blocks of predetermined size, and the host 3 reads/writes data to/from each of the blocks. These memory devices are used in combination with memory devices (internal volumes) 36 for internally storing data in the hosts 3.

Each logical volume LU is assigned a unique identifier (LUN: Logical Unit Number). In this embodiment, data is input or output by designating an address, which is a combination of this identifier and a unique number (LBA: Logical Block Address) assigned to each of the blocks.

The controller 41 includes information processing resources such as a CPU (Central Processing Unit) and a memory, and controls data input or data output to/from the logical volumes LU in response to a request from the hosts 3.

This invention is characterized in that the multi-host management server 2 temporarily stores failure information from the hosts 3 in a queue in the multi-host management software 22, retrieves the latest failure information from pieces of failure information received from a common host after a predetermined time period, extracts host name information from the retrieved failure information, and executes host refresh on the relevant host 3.

First, the host information table 24, the integrated path information table 25 and the failure information table 26 managed by the multi-host management server 2, which realize the above characteristic, will be described in detail.

(2) Host Information Table

Figure 3:
FIG. 3 is a diagram showing a host information table managed by a multi-host management server according to the above embodiment.

As shown in FIG. 3, the host information table 24 is a table for managing information about each host 3 and includes "HOST" fields 24A, "IP address" fields 24B, "version" fields 24C and "flag" fields 24D.

The "HOST" field 24A, the "IP address" field 24B and the "version" field 24C respectively store the host name, the IP address and the software version of the multi-path management software 34 for each host 3. The "flag" field 24D stores information about whether the path information managed by each host 3 is up-to-date in the multi-host management server 2. In the "flag" field 24D of this embodiment, a flag "0" is set when the path information is up-to-date, while a flag "1" is set when the path information is not up-to-date.

(3) Path Information Table

Figure 4:
FIG. 4 is a diagram showing a path information table managed by the multi-host management server according to the above embodiment.

As shown in FIG. 4, the integrated path information table 25 is a table for integrally managing path information for all hosts 3, for each of which a plurality of paths P is set. Specifically, the integrated path information table 25 includes "PATH" fields 25A, "HOST" fields 25B, "HBAP" fields 25C, "IVOL" fields 25D, "STRG" fields 25E, "CHAP" fields 25F, "EVOL" fields 25G and "STAT" fields 25H.

The "PATH" field 25A, the "HOST" field 25B, the "HBAP" field 25C and the "IVOL" field 25D respectively store the identifier for a path P, the host name for a host 3, the identifier for a HBA port for a host 3 and the identifier for a memory device 36 (internal volume). The "STRG" field 25E, the "CHAP" field 25F and the "EVOL" field 25G respectively store the storage name for a storage apparatus 4, the identifier for a CHA port and the identifier for a logical volume LU (external volume). The "STAT" field 25H stores a path status indicating whether the path P is online or not.

For example, as shown in FIG. 5, when the multi-host management server 2 requests acquisition or update of path information for each host 3, the host 3 that receives the request for the path information responds to the request. Then, the host 3 transmits the path information it manages to the multi-host management server 2. When the multi-host management server 2 receives this path information, the processor 20 in the multi-host management server 2 runs the multi-host management software 22. The processor 20 reads the integrated path information table 25 stored in the memory device 23 and updates the path information of the relevant host 3 in the integrated path information table 25.

(4) Failure Information Table

Figure 6:
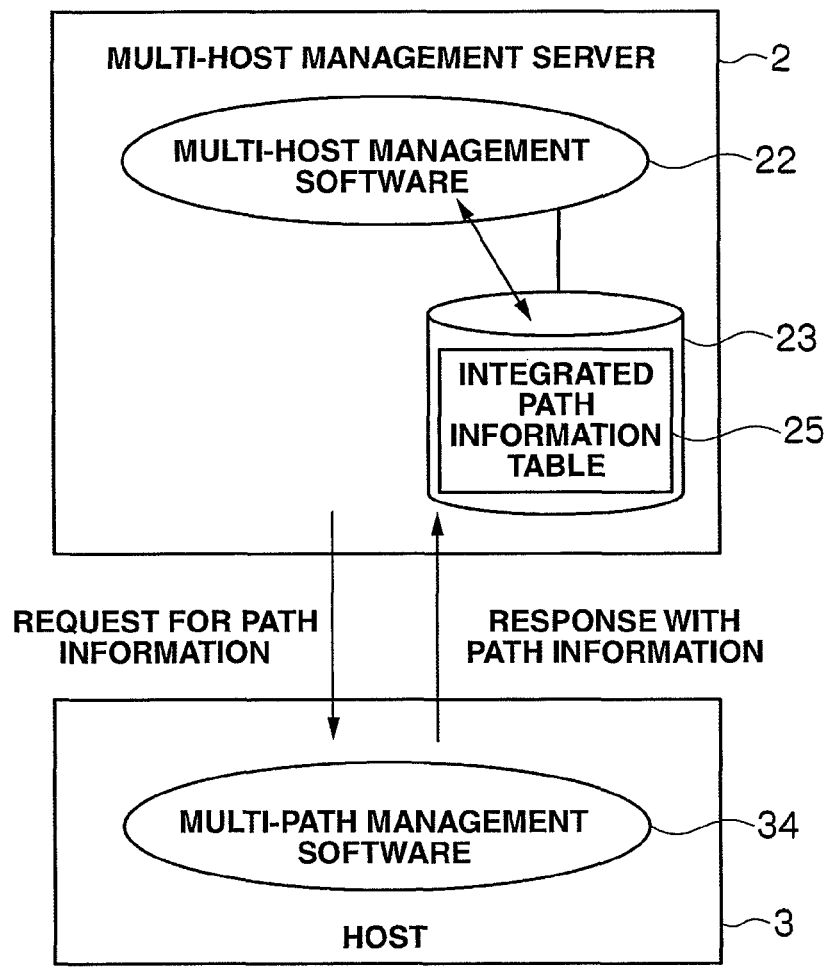
FIG. 6 is a diagram showing a failure information table managed by the multi-host management server according to the above embodiment.

As shown in FIG. 6, the failure information table 26 is a table for managing the failure information that the multi-host management server 2 receives from each host 3. The failure information table 26 includes "HOST" fields 26A showing the host name of the host 3 connected to the path P in which a failure has occurred, "PATH" fields 26B showing the identifier for the path having the failure, and "DATE" fields 26C showing time information about the time the host 3 received the failure information. The "DATE" fields 26C may alternatively store time information about the time the host 3 detects the failure.

Figure 7:
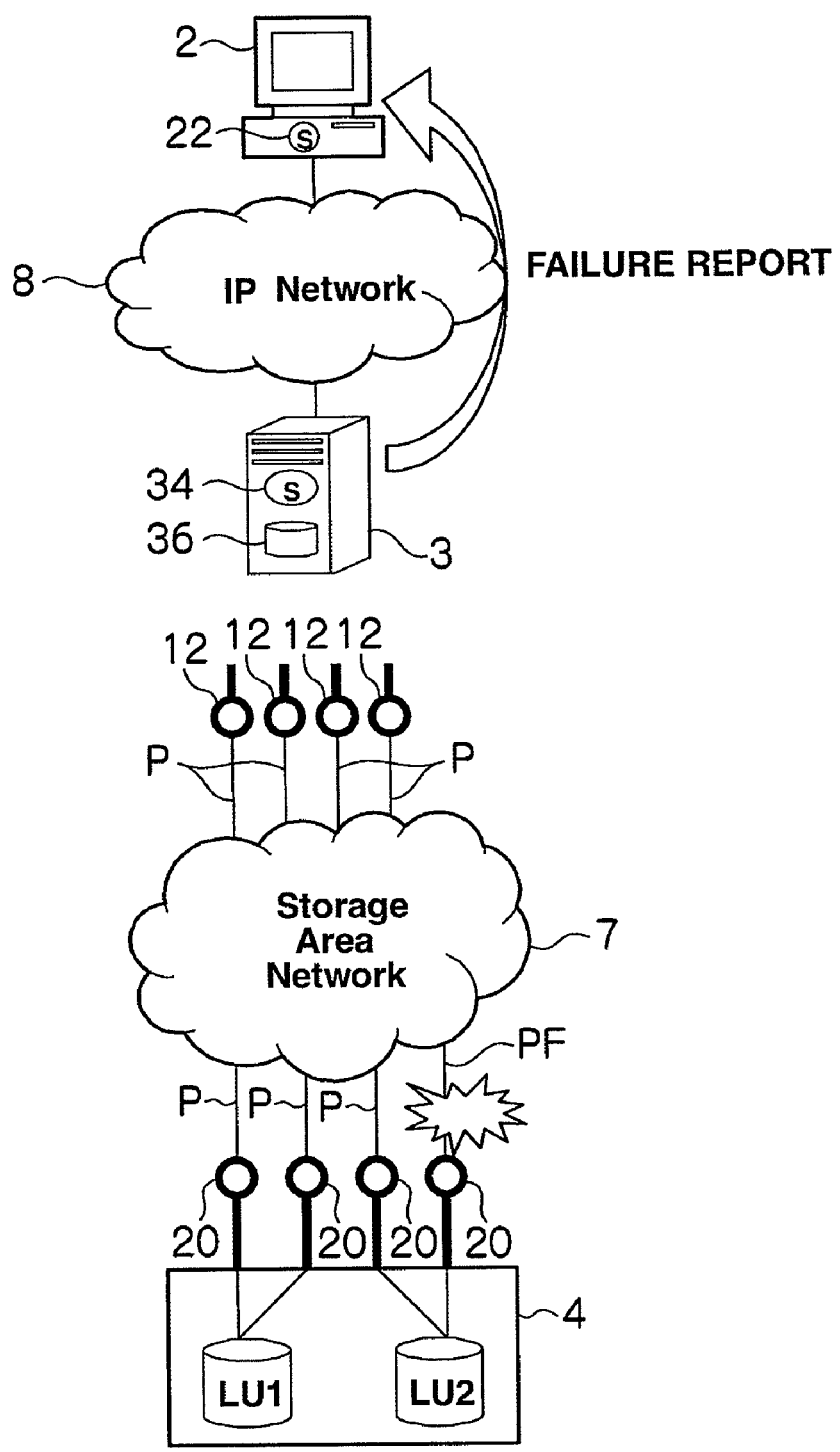
FIG. 7 is a conceptual diagram showing how the multi-host management server receives the failure information according to the above embodiment.

For example, as shown in FIG. 7, when a failure occurs in a certain path PF in a plurality of paths P, the relevant host 3 provides the multi-host management server 2 with failure information about the path PF having the failure. This failure information provided by the relevant host 3 includes the name of the relevant host 3, the identifier for the path PF, and time information about the time the relevant host 3 received the failure information. When the multi-host management server 2 receives the failure information, the processor 20 in the multi-host management server 2 runs the multi-host management software 22. The processor 20 reads the failure information table 26 stored in the memory device 23 and updates the failure information table 26.

In this invention, although the failure information including the time information about the time when the host 3 receives this failure information is described, the failure information may alternatively include only the host name and the path identifier that are part of the path information.

(5) Path Information Table

Next, the path information table 35 managed by each host 3 will be described in detail.

As shown in FIG. 8, the path information table 35 is a table for managing the path information for each host 3 in order to constantly or periodically monitor the statuses of paths P set to each host 3. The path information table 35 includes "PATH" fields 35A, "HBAP" fields 35B, "IVOL" fields 35C, "STRG" fields 35D, "CHAP" fields 35E, "EVOL" fields 35F and "STAT" fields 35G.

Since the "PATH" fields 35A, the "HBAP" fields 35B, the "IVOL" fields 35C, the "STRG" fields 35D, the "CHAP" fields 35E, the "EVOL" fields 35F and the "STAT" fields 35G are fields corresponding respectively to the above-described "PATH" fields 25A, "HBAP" fields 25C, "IVOL" fields 25D, "STRG" fields 25E, "CHAP" fields 25F, "EVOL" fields 25G and "STAT" fields 25H, their descriptions will be omitted.

(6) Function of Multi-Host Management Software

Next, the functions of the multi-host management software 22 for realizing the multi-host management server 2 of the storage system 1 according to this invention will be described below.

Figure 9:
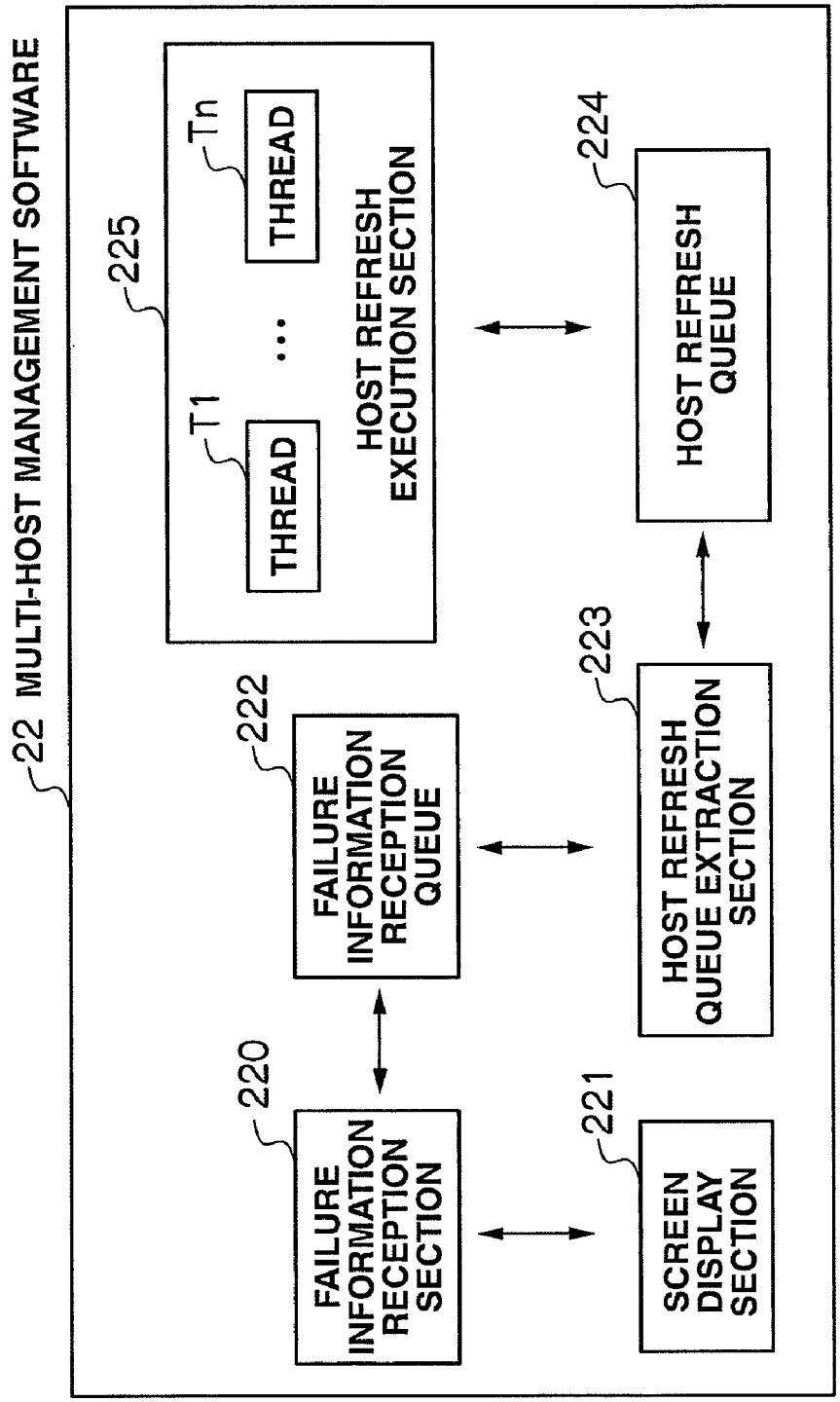
FIG. 9 is a block diagram showing the function of multi-host management software according to the above embodiment.

First, FIG. 9 is a function block diagram showing the multi-host management software 22.

It is obvious that the processor 20 in the multi-host management server 2 executes the multi-host management software 22 based on function blocks (which will be described later) in the multi-host management software 22.

The multi-host management software 22 includes at least a failure information reception section 220, a screen display section 221, a failure information reception queue 222, a host refresh queue extraction section 223, a host refresh queue 224 and a host refresh execution section 225.

The failure information reception section 220 functions, when receiving from each host 3 the failure information including the host name, the path identifier and the time when the host 3 receives the failure, to store the failure information in the later-described failure information reception queue 222. The failure information reception section 220 registers the received failure information in the failure information table 26 stored in the memory device 23. Then the failure information reception section 220 refers to the host information table 24 in the memory device 23 and sets a non-update flag "1" in the host information table 24 field corresponding to the host 3 that has transmitted that failure information.

The screen display section 221 functions to report the statuses of the hosts 3 to a user. Specifically, the screen display section 221 refers to the host information table 25 after the reception of the failure information and reports to the user the status, i.e., whether or not the host refresh has been executed for the relevant host 3. In other words, the screen display section 221 reports to the user the status indicating whether or not the path information for the relevant host 3 is up-to-date.

As a method for reporting the above status to the user, the processor 20 in the multi-host server 2 performs display processing such as adding a certain mark on icons showing the hosts 3 on the management screen S1 of the multi-host management server 2. Alternatively, the processor 20 in the multi-host server 2 may provide a message to the user on the management screen S1 of the multi-host management server 2.

Figure 10:
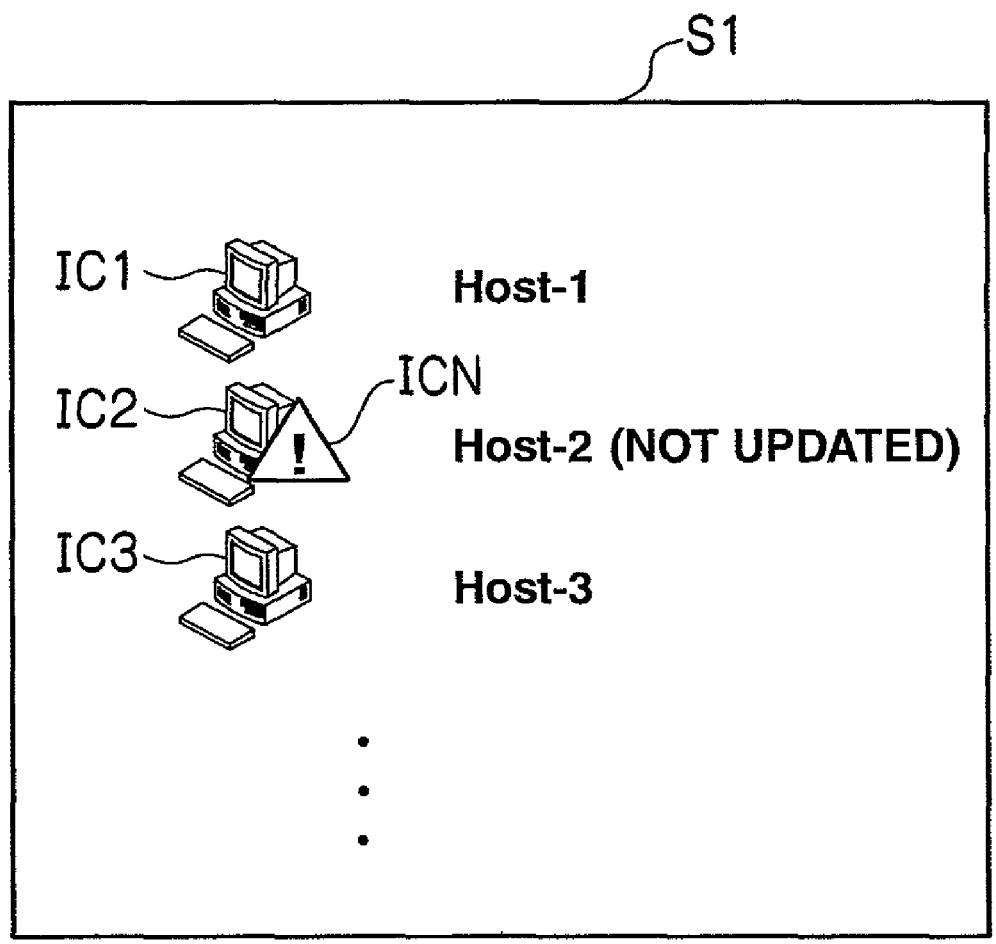
FIG. 10 is an illustration showing a management screen for icons indicating hosts according to the above embodiment.

FIG. 10 shows an example of a method for reporting to the user where the icons displayed in the management screen S1 of the multi-host management server 2 is used.

In FIG. 10, the top icon IC1 and the bottom icon IC3 indicate the hosts 3 in the normal status. Meanwhile, an icon ICN is added to the center icon IC2, the icon ICN indicating that a report of failure information has been received for the relevant host 3 but the host refresh has not been executed (i.e., the path information for the relevant host 3 is not up-to-date). In addition, the message "Not updated" is displayed with this center icon IC2.

As described above, if the non-update flag indicating that the host refresh has not been executed (i.e., the path information is not up-to-date) is set in the host information table 24, icons like the center icon IC2 and ICN in FIG. 10 are displayed. On the other hand, if the non-update flag is not set or an update flag indicating that the host refresh has been executed (i.e., the path information is up-to-date) is set in the host information table 24, an icon like the top icon IC1 or the bottom icon IC3 in FIG. 10 is displayed.

Figure 11:
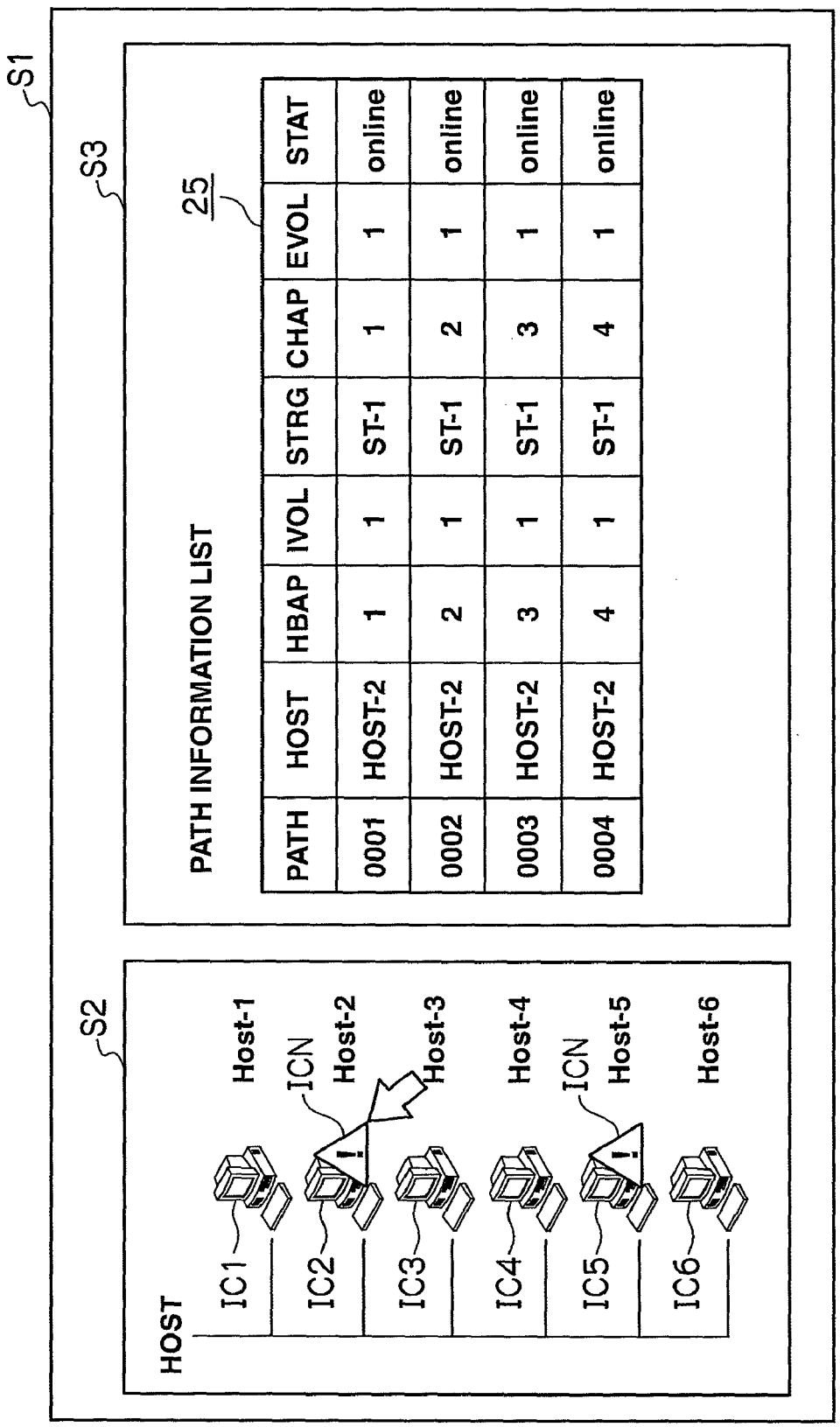
FIG. 11 is an illustration showing a management screen for the path information table according to the above embodiment.

For example, the hosts 3 are displayed in a tree structure in a host screen S2 on the management screen S1 of the multi-host management server 2 as shown in FIG. 11. If the identifier for the host 3 indicated in the failure information is "2," the user can check the non-update status with the integrated path information table 25 in this host screen S2. When the user clicks the icon IC2 of the "Host-2," only path information for this Host-2 in the integrated path information table 25 is output in a path information list screen S3.

Figure 12:
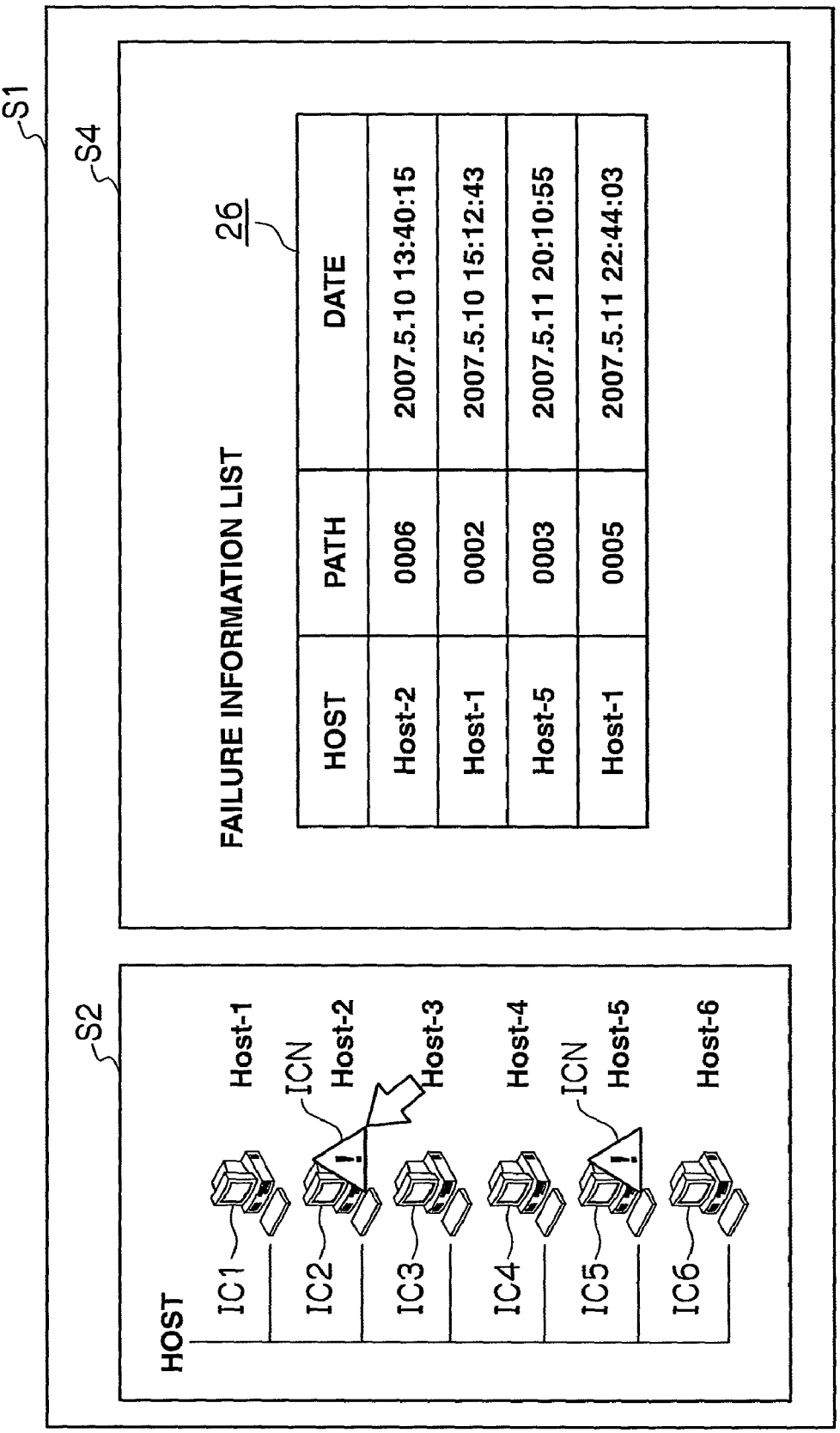
FIG. 12 is an illustration showing a management screen for the failure information table according to the above embodiment.

As shown in FIG. 12, if the identifier for the host 3 indicated in the failure information is "2," the user can check the failure information table 26 in the host screen S2 on the management screen S1 of the multi-host management server 2. When the user clicks the icon IC2 of the "Host-2," the failure information table 26 including this Host-2 is output in a failure information list screen S4.

Referring back to FIG. 9, the failure information reception queue 222 functions to register time information such as the time when the failure information is received from the host 3 and the failure detection time.

The host refresh queue extraction section 223 functions to extract failure information that has been kept for a predetermined time period after the failure reception time and to retrieve the latest failure information from plural pieces of failure information pertaining to a common host. The host refresh extraction section 223 also functions to register host-indicating information of this common host in the later-described host refresh queue 224. In addition, the host refresh queue extraction section 223 functions to delete, after the above registration in the host refresh queue 224, all failure information relating to the common host from the failure information reception queue 222. In this invention, although information about a host name (hereinafter referred to as host name information) is utilized as the host-indicating information, other information may be utilized as long as the multi-host management server 2 can identify the host 3.

The host refresh queue 224 functions to store the host name information of the host as a host-refresh target (which is a host-refresh target). The host 3 indicated in the failure information and stored in this host refresh queue 224 is a target for the host refresh processing that will be executed by the later-described host refresh execution section 225.

The host refresh execution section 225 functions to execute the host refresh. When the host refresh execution section 225 acquires the host name information registered in the host refresh queue 224, threads T1 to Tn are run. The number of the running threads T1 to Tn is limited. The number of the threads T1 to Tn is set so that a host refresh that updates many pieces of path information simultaneously in a short time period will not be executed for more than one host 3.

The host refresh execution section 225 executes the host refresh on the relevant host 3. In other words, the integrated path information table 25 in the memory device 23 is up-to-date. For example, suppose that a failure occurs on a certain path PF as shown in FIG. 7. Then the status of the host 3 managing this path PF is set to "offline" in the integrated path information table 25.

The host refresh is preferably executed on each host 3, but may be executed on each path P.

It should be noted that only the multi-host management software 22 functions that technically characterize this invention are shown in FIG. 9; functions the multi-host management software 22 would normally be equipped with are not shown. The functions in this invention are separated only logically, and may physically share a common area.

(6-1) Failure Information Reception Processing

Figure 13:
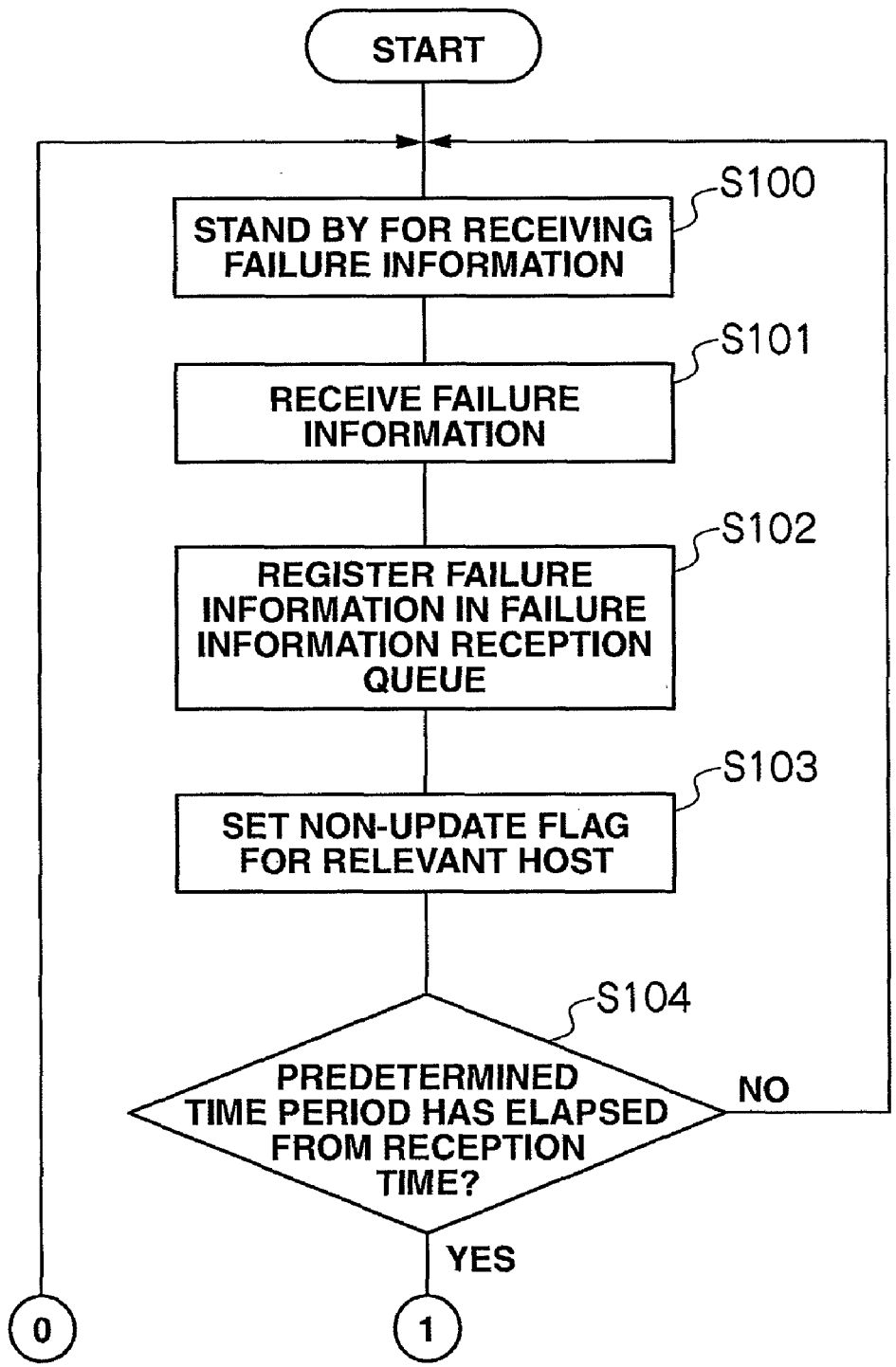
FIG. 13 is a flowchart showing failure reception processing according to the above embodiment.
Figure 14:
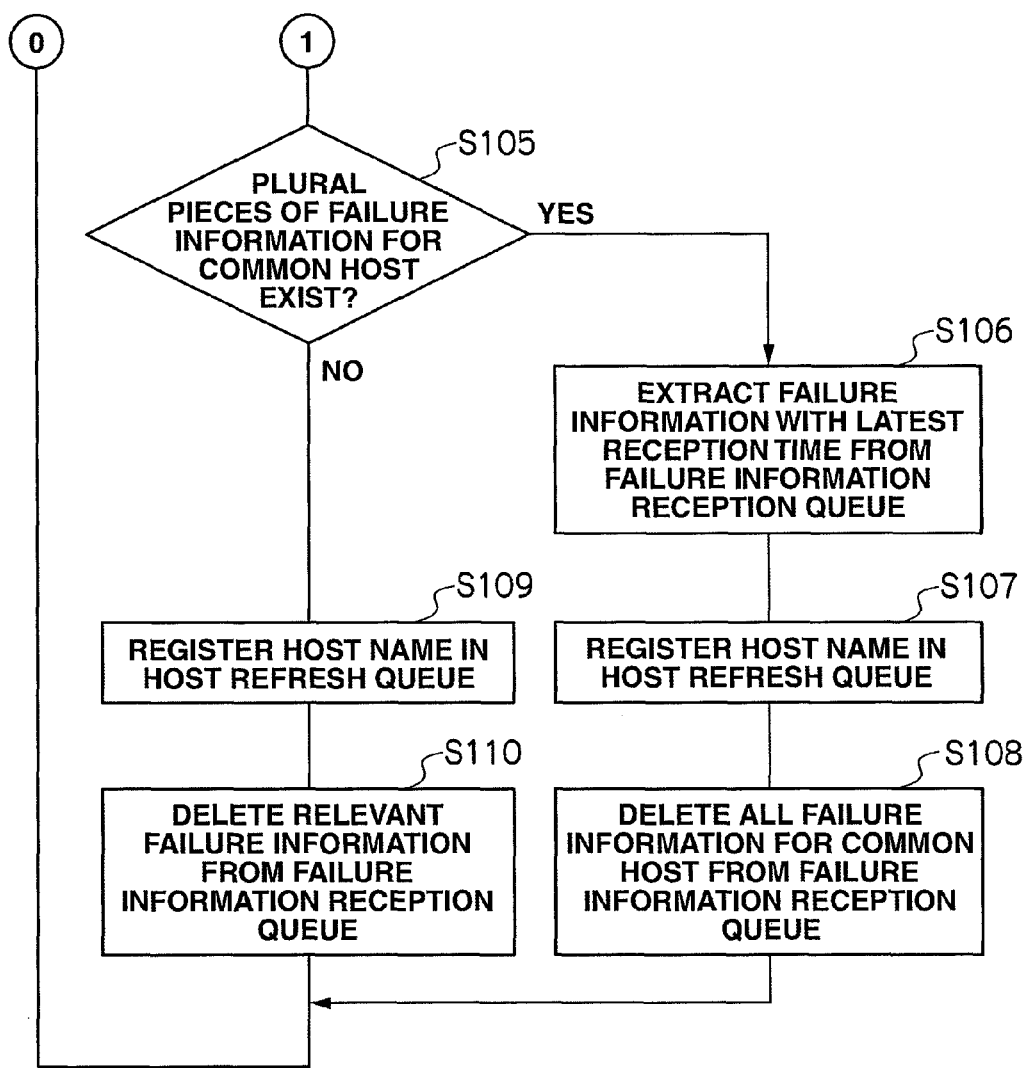
FIG. 14 is another flowchart showing the failure reception processing according to the above embodiment.

FIGS. 13 and 14 are flowcharts showing failure information reception processing that is performed by the multi-host management server 2 in order to realize the host refresh of this invention. The processor 20 in the multi-host management server 2 performs this failure information reception processing based on the multi-host management software 22.

More specifically, the processor 20 of the multi-host management server 2 stands by until it receives failure information about a path P from each host 3 (S100).

When failure information about a path P is transmitted from a certain host 3, the processor 20 receives this failure information via the failure information reception section 220 (S101).

When the processor 20 registers the received failure information together with the reception time in the failure information reception queue 222 (S102), the failure information reception section 220 sets a non-update flag 1 in the field corresponding to the host 3 indicated in this failure information in the host information table 24 (S103).

The processor 20 operates the host refresh queue extraction section 223 to refer to the reception time for each piece of failure information stored in the failure information reception queue 222 and judges whether or not there is failure information that has been kept for a predetermined time period from the relevant reception time (S104). Here, the predetermined time period indicates the time period that has elapsed since the host refresh queue extraction section 223 received the failure information, and may be about 10 to 20 seconds.

If it is determined that there is the failure information that has been kept for the predetermined time period from the reception time (S104: YES), the processor 20 operates the host refresh queue extraction section 223 to check whether or not plural pieces of failure information for the same host 3 as that in the received failure information are stored in the failure information reception queue 222 (S105).

If the processor 20 finds that plural pieces of failure information for the same host 3 are stored in the failure information reception queue 222 (S105: YES), the processor 20 retrieves failure information containing the latest reception time from the plural pieces of failure information for the same host 3 (S106). The processor 20 then registers the host name information for the host having the retrieved failure information in the host refresh queue 224 (S107).

Then the processor 20 deletes all the failure information for the same host 3 from the failure information reception queue 222 (S108) and again stands by until it receives failure information about a path P from the hosts 3 (S100).

On the other hand, if the processor 20 finds that plural pieces of failure information for the same host 3 are not stored in the failure information reception queue 222 (S105: NO), the processor 20 registers the host name contained in the received failure information in the host refresh queue 224 (S109).

Then the processor 20 deletes the failure information for the host 3 from the failure information reception queue 222 (S110) and again stands by until it receives failure information about a path from the hosts 3 (S100).

If the processor 20 determines that there is no failure information that has been kept for a predetermined time period from the reception time in step S104 (S104: NO), the processor again stands by until it receives failure information about a path from the hosts 3 (S100).

Figure 15:
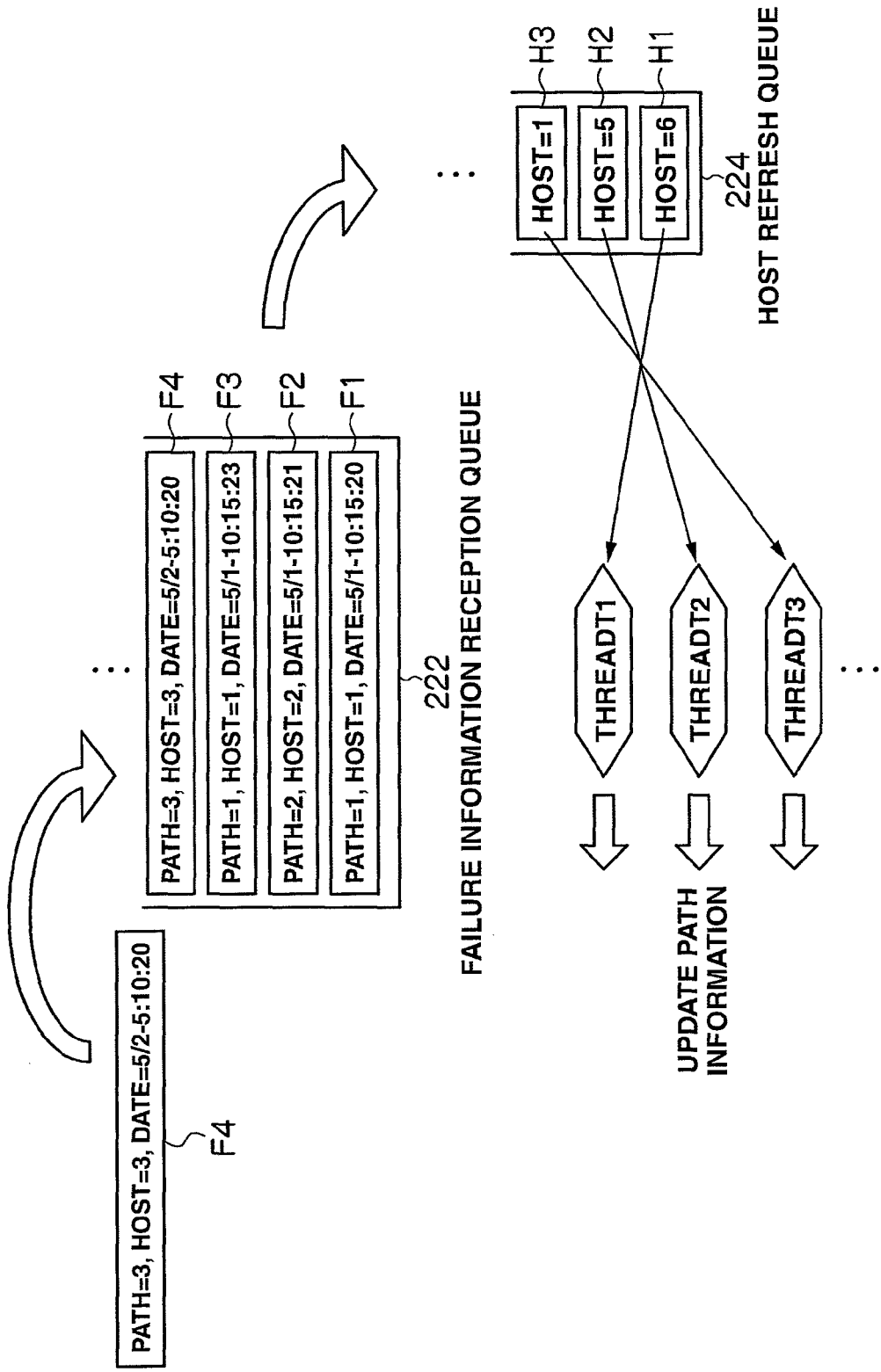
FIG. 15 is a conceptual diagram showing the failure reception processing according to the embodiment.

Now, an example of the above-described failure information reception processing will be described more specifically referring to FIG. 15. In FIG. 15, the failure information reception queue 222 stores four pieces of failure information: failure information having the host name "1," the path identifier "1" and the reception time "May 1, 10:15:20" (which will be referred to as "failure information F1"); failure information having the host name "2," the path identifier "2" and the reception time "May 1, 10:15:21" (which will be referred to as "failure information F2"); failure information having the host name "1," the path identifier "1" and the reception time "May 1, 10:15:23" (which will be referred to as "failure information F3"); and failure information having the host name "3," the path identifier "3" and the reception time "May 2, 5:10:20" (which will be referred to as "failure information" F4).

The processor 20 constantly or periodically monitors the failure information reception queue 222 with the host refresh queue extraction section 223. When a predetermined time period has elapsed from the reception time of the failure information F1, the processor 20 extracts the failure information F1 from the failure information reception queue 222.

Then, the processor 20 checks whether or not failure information with the same host name as host name "1" in the failure information F1 is stored in the failure information reception queue 222 (i.e., checks whether or not other failure information with the host name "1" is stored in the failure information reception queue 222). Subsequently, the processor 20 determines that the host name in the failure information F3 is the same, i.e., "1."

The processor 20 extracts the reception time in the failure information F3, compares the reception time (May 1, 10:15:20) contained in the failure information F1 with the reception time (May 1, 10:15:23) contained in the failure information F3, and selects the latest failure information.

Here, the processor 20 determines that the failure information F3 is the latest failure information and registers host name information H3 (which is "Host=1" in this example) in the failure information F3 in the host refresh queue 224.

It should be noted that when the host refresh queue extraction section 223 registers the host name information H1 to H3 in the host refresh queue 224, it may register the failure information F1 to F4 itself or may register only the host name information H1 to H3 included in the failure information. In short, information that shows which host 3 is a host refresh target can be registered in the host refresh queue 224.

Once the processor 20 registers the host name information H3 to the host refresh queue 224 based on the latest failure information F3, the failure information F1 and the failure information F3 are no longer necessary, so the processor 20 deletes these failure information F1 and failure information F3 from the failure information reception queue 222.

As a result of the above processing that the processor 20 operates the host refresh queue extraction section 223 to perform, the failure information F2 and the failure information F4 are left in the failure information reception queue 222, and the processor 20 continues to monitor the failure information reception queue 222.

The processor 20 can recognize which host requires the update of path information based on the host name information H1 to H4 stored in the host refresh queue 224.

(6-2) Path Information Update Processing

Next, the path information update processing in which the processor 20 runs the threads T1 to Tn to update path information will be described below. The processor 20 performs this path information update processing based on the multi-host management software 22.

Figure 16:
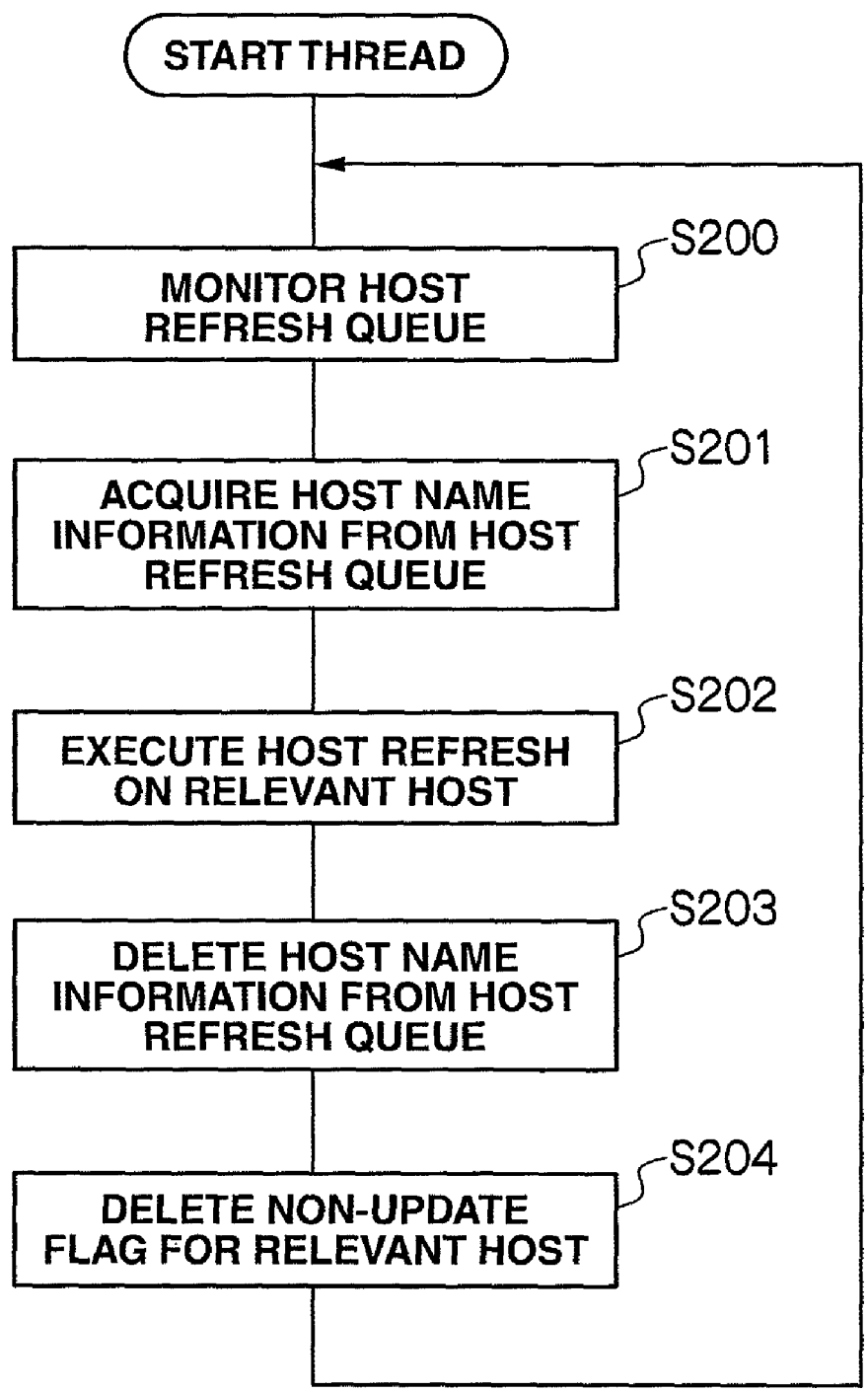
FIG. 16 is a flowchart showing path information update processing according to the above embodiment.

Specifically, as shown in FIG. 16, the processor 20 either constantly or periodically monitors the host refresh queue 224 (S200). When host name information H is registered in the host refresh queue 224, the processor 20 sequentially acquires the host name information for the threads T1 to Tn (S201).

The processor 20 executes the host refresh on the host 3 having this host name information (S202). Specifically, the processor 20 makes a request for the host 3 indicated in the host name information acquired by the processor 20 to acquire path information. Then the host 3 that receives the acquisition request for the path information acquires and transfers the relevant path information stored in the memory device 36 to the multi-host management server 2. After receiving this path information, the multi-host management server 2 updates the integrated path information table 25 stored in the memory device 23. Consequently, the path information for the host 3 indicated in the host name information that was acquired for the threads T1 to Tn is up-to-date.

After the execution of the host refresh, the processor 20 deletes the relevant host name information from the host refresh queue 224 (S203), deletes the non-update flag indicating that the host refresh has not been executed in the host information table 24 and sets the update flag "0" (S204).

After updating the host information table 24, the process returns to step S200 and the processor 20 again monitors the host refresh queue 224.

Although the number of threads T1 to Tn provided in the host refresh execution section 225 is preferably more than one, as shown in FIG. 9, the number of threads may also be one. In the arrangement where more than one threads T1 to Tn are provided, each of the threads T1 to Tn performs the processing in parallel. In addition, the number of threads T1 to Tn may be arbitrarily set, and setting a limit to the number of threads can prevent many host refreshes from being executed simultaneously in a short time period.

(7) Effects and Advantages of Embodiment

The multi-host management server in this embodiment temporarily stores failure information in the queue and executes the host refresh after a predetermined time period elapses. With the arrangement, the multi-host management server extracts (plural pieces of) failure information regarding a common host which has (have) been kept for a predetermined time period and retrieves the latest failure information from the extracted failure information. Then the multi-host management server executes the host refresh based on the latest failure information for the common host and deletes all the failure information including this latest failure information from the queue. Accordingly, the storage system of this embodiment can reduce the number of unnecessary host refreshes. In particular, in the situation where a plurality of failures occurs in a short time period like the instantaneous path interruption, the load on the network can be greatly reduced.

Also, the multi-host management server in this embodiment does not execute the host refresh soon after the reception of the failure information, but instead executes the host refresh after keeping the failure information for a predetermined time period. With this arrangement, a time lag is generated between the reception of the failure information and the execution of the host refresh. Accordingly, in this embodiment, the multi-host management server is arranged so that, when the host refresh has not been executed even after the reception of the failure information, a user can recognize that situation. This arrangement can avoid problems in which a user performs an operation using a path having a failure (e.g., disconnection) without being aware of the failure and causes trouble to occur in the host's processing.

While the invention has been described with respect to a limited number of embodiments, those skilled in the art, having the benefit of this disclosure, will appreciate that other embodiments can be devised that do not depart from the scope of the invention as disclosed herein. Accordingly, the scope of the invention should be limited only by the attached claims.

What is claimed is:

1. A multi-host management server computer that manages a plurality of host computers, where each host computer has a plurality of paths set between the host computer and a storage apparatus and stores path information for each host computer, the multi-host management server computer comprising:

a memory;

a reception section that receives failure information for each incidence of failure of any path from the plurality of host computers, and stores the received said failure information for said each incidence of failure in a failure information reception queue;

an extraction section that extracts any plural different incidences of failure information concerning different failures of different paths which are associated with a common host computer, from the failure information reception queue;

a retrieval section that retrieves failure information about one path from the extracted said plural different incidences of failure information of the different paths of the common host computer;

a registration section that registers, based on the retrieved failure information about the one path, host indicating information indicating the common host computer relevant to this failure information, in a host refresh queue for queuing up an updating of path information for the common host computer;

a deletion section that deletes, after the registration of the host-indicating information in the host refresh queue, the plural different incidences of failure information concerning the common host computer from the failure information reception queue; and an execution section that executes, based on the host-indicating information in the host refresh queue, retrieval of updated path information for the common host computer, and an update of path information for the common host computer based on retrieved said updated path information.

2. The multi-host management server computer according to claim 1, wherein the extraction section extracts the plural different incidences of failure information about the plurality of paths received from the common host computer, after a predetermined time period from reception times of the plural different incidences of failure information in the failure information reception queue.

3. The multi-host management server computer according to claim 2, wherein:

the multi-host management server computer manages the host computers using a host information table that stores a flag indicating whether or not path information is up-to-date for each host computer; and the multi-host management server computer further includes a screen display section that refers to the flag stored in the host information table and displays on a screen of the multi-host management server computer a display showing, after failure information about a path was received from a certain host computer, whether or not path information for the certain host computer is up-to-date.

4. The multi-host management server computer according to claim 3, wherein the multi-host management server computer sets a non-update flag indicating that the path information is not up-to-date in the host information table, after the failure information about the path is received from the certain host computer.

5. The multi-host management server computer according to claim 1, wherein the execution section executes the update of the path information on a limited number of threads.

6. The multi-host management server computer according to claim 1, wherein the retrieval section retrieves failure information about a path whose reception time which is the time when the failure information is received by the host computer, is the latest from the extracted plural different incidences of failure information about the plurality of paths.

7. A multi-host management method executed by a multi-host management server computer that manages a plurality of host computers, where each host computer has a plurality of paths set between the host computer and a storage apparatus and stores path information for each host computer, the multi-host management method comprising:

receiving failure information for each incidence of failure of any path from the plurality of host computers, and storing the received said failure information for said each incidence of failure in a failure information reception queue;

extracting any plural different incidences of failure information concerning different failures of different paths which are associated with a common host computer, from the failure information reception queue;

retrieving failure information about one path from the extracted said plural different incidences of failure information of the different paths of the common host computer;

registering, based on the retrieved failure information about the one path, host indicating information indicating the common host computer relevant to this failure information, in a host refresh queue for queuing up an updating of path information for the common host computer;

deleting, after the registration of the host-indicating information in the host refresh queue, the plural different incidences of failure information concerning the common host computer from the failure information reception queue; and executing, based on the host-indicating information in the host refresh queue, retrieval of updated path information for the common host computer, and an update of path information for the common host computer based on retrieved said updated path information.

8. The multi-host management method according to claim 7, wherein the method further comprising:

extracting, by the multi-host management server computer, the plural different incidences of failure information about the plurality of path information received from the common host computer, after a predetermined time period from reception times of the plural different incidences of failure information in the failure information reception queue.

9. The multi-host management method according to claim 8, wherein the method further comprising:

managing, by the multi-host management server computer, the host computers using a host information table that stores a flag indicating whether or not path information is up-to-date for each host computer; and referring, by the multi-host management server computer, to the flag stored in the host information table and displaying on a screen of the multi-host management server computer a display showing, after failure information about a path is received from a certain host computer, whether or not path information for the certain host computer is up-to-date.

10. The multi-host management method according to claim 9, wherein the method further comprising:

setting, by the multi-host management server computer, a non-update flag indicating that the path information is not up-to-date in the host information table after the failure information about the path is received from the certain host computer.

11. The multi-host management method according to claim 7, wherein the method further comprising:

updating, by the multi-host management server computer, the path information on a limited number of threads.

12. The multi-host management method according to claim 7, wherein the method further comprising:

receiving, by the multi-host management server, computer failure information about a path whose reception time which is the time when the failure information is received by the host computer, is the latest from the extracted plural different incidences of failure information about the plurality of paths.

* * * * *